United States Patent
Beall et al.

(10) Patent No.: US 6,677,272 B2
(45) Date of Patent: Jan. 13, 2004

(54) MATERIAL FOR NOX TRAP SUPPORT

(75) Inventors: Douglas M. Beall, Painted Post, NY (US); Shahid G. Lakhwani, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 18 days.

(21) Appl. No.: 09/929,915

(22) Filed: Aug. 15, 2001

(65) Prior Publication Data

US 2003/0040432 A1 Feb. 27, 2003

(51) Int. Cl.[7] .............. B01J 21/04; B01J 23/02; B01J 20/00; B01J 23/00; C04B 35/03

(52) U.S. Cl. ............. 502/439; 502/415; 502/341; 502/351; 502/355; 502/527.19; 501/118; 501/125; 501/127; 501/136

(58) Field of Search ................ 502/439, 415, 502/341, 351, 355, 527.19; 501/118, 125, 127, 136

(56) References Cited

U.S. PATENT DOCUMENTS

| | | | | |
|---|---|---|---|---|
| 3,942,293 A | * | 3/1976 | Cook ............................ 52/232 |
| 3,953,636 A | * | 4/1976 | Kirchner ..................... 428/155 |
| 4,327,188 A | | 4/1982 | Endo et al. |
| 4,329,248 A | * | 5/1982 | Ringwood .................... 252/628 |
| 4,855,265 A | | 8/1989 | Day et al. ..................... 501/128 |
| 4,915,887 A | | 4/1990 | Day et al. |
| 4,942,146 A | * | 7/1990 | Negas et al. ................. 501/134 |
| 4,980,246 A | * | 12/1990 | Negas et al. ................. 428/702 |
| 5,024,980 A | * | 6/1991 | Negas et al. ................. 501/134 |
| 5,106,802 A | | 4/1992 | Horiuchi et al. |
| 5,147,835 A | * | 9/1992 | Franzak et al. .............. 501/134 |
| 5,153,153 A | * | 10/1992 | Freudenberg et al. ....... 501/127 |
| 5,288,672 A | * | 2/1994 | Gugel et al. ................. 501/134 |
| 5,346,870 A | * | 9/1994 | Noguchi et al. ............. 501/136 |
| 5,491,116 A | * | 2/1996 | Beall et al. ...................... 501/5 |
| 5,633,084 A | * | 5/1997 | Hiraiwa et al. .............. 428/403 |
| 5,948,376 A | | 9/1999 | Miyoshi et al. |
| 6,077,796 A | * | 6/2000 | Beall et al. ...................... 501/9 |
| 6,200,376 B1 | * | 3/2001 | Katamoto et al. ........... 106/439 |
| 6,245,307 B1 | | 6/2001 | Inui et al. |
| 6,300,266 B1 | * | 10/2001 | Beall et al. .................. 501/119 |
| 6,432,856 B1 | * | 8/2002 | Beall et al. .................. 501/118 |

FOREIGN PATENT DOCUMENTS

JP           4-87625         3/1992

OTHER PUBLICATIONS

Qian et al., "Effects of Excess Alumina on Microstructure of Aluminum Titanate Ceramics Prepared From Mixture of Alumina and Titania", Yogyo–Kyokai Shi, 93(6), 1985, p. 1–12.

* cited by examiner

Primary Examiner—Cam N. Nguyen
(74) Attorney, Agent, or Firm—Anca C. Gheorghiu

(57) ABSTRACT

A ceramic support element for a NOx trap which includes a NOx storage component comprising an alkali metal, the ceramic support having a composition lying within a ternary system selected from the group consisting of $Al_2TiO_5$—$MgTi_2O_5$—$MgAl_2O_4$ and $Al_2TiO_5$—$FeTiO_5$—$Al_2O_3$, a coefficent of thermal expansion (22–800° C.) of less than $20 \times 10^{-7}$/° C. and a modulus of rupture as measured on a solid rod of circular cross section of greater than 1000 pounds per square inch.

19 Claims, 2 Drawing Sheets

MATERIAL FOR NOX TRAP SUPPORT

BACKGROUND OF THE INVENTION

The present invention relates to a ceramic support element for NOx traps. More specifically, the present invention relates materials for NOx trap supports which exhibits migration resistance to alkali metal NOx storage components combined with good strength and low coefficient of thermal expansion.

Gasoline direct injection (GDI) engines are becoming increasingly popular due to the promise of increased fuel efficiency. Similarly to conventional engines, the exhaust gas discharged from GDI engines needs to purified of nitrogen oxides (NOx). However, unlike conventional engines which employ three-way catalysts, the GDI engine which is a partial lean burn gasoline engine producing exhaust gas with an excess amount of oxygen, cannot only employ the services of three-way catalysts because these require conditions where the air-fuel ratio is substantially stoichiometric.

NOx traps appear to be a leading candidate for exhaust purification in GDI engines. NOx traps are similar to three-way catalysts, in that they are made of a support and a catalyst coating the support, with the difference existing in that NOx traps include an additional component in the catalyst coating which stores the trapped NOx. The NOx storage component is typically an alkaline earth, alkali, or rare-earth metal compounds. Alkali metal-based NOx traps hold the most promise in providing high trapping efficiency over a wide temperature range. A disadvantage of alkali metal-based NOx support components, however, is incompatibility with cordierite supports, the standard in the three-way catalyst industry. Research has shown that the alkali metal in the catalyst coating migrates into the cordierite support during use at high temperatures. This results in a decrease in the trapping efficiency of the NOx trap and alteration of the chemical composition of the underlying material destroying the desirable properties of the NOx trap support.

Recently, much effort has been concentrated in the area of developing NOx support materials that resist migration of NOx alkali metal storage components, and therefore do not suffer the deficiencies associated with cordierite. Co-pending provisional application entitled "Catalyst for Purifying Exhaust Gases" by Cutler et al., co-assigned to the present assignee, and herein incorporated by reference in its entirety is directed at such materials. Such materials, however, are expected to exhibit a low four-point modulus of rupture strength of less than 1000 pounds per square inch (psi) as measured on a solid rod of circular cross section, which is undesirable for applications in harsh environments.

A need therefore exists to have NOx trap support materials which resist migration of NOx alkali metal storage components with higher strength than has been achieved up to now, while at the same time with low coefficient of thermal expansion.

SUMMARY OF INVENTION

The present invention provides novel materials for NOx trap supports, the materials offering resistance to migration of NOx alkali metal storage components in combination with high strength and low coefficient of thermal expansion.

These novel materials are selected from the ternary systems of $Al_2TiO_5$—$MgTi_2O_5$—$MgAl_2O_4$ and $Al_2TiO_5$—$FeTiO_5$—$Al_2O_3$. In a preferred embodiment the inventive materials consist essentially, in terms of weight percent on an oxide basis, of: 15 to 90 wt. % $Al_2TiO_5$, 2 to 45 wt. % $MgTi_2O_5$, and 5 to 55 wt. % $MgAl_2O_4$. In another preferred embodiment the inventive materials consists essentially, in terms of weight percent on an oxide basis, of: 35 to 85 wt. % $Al_2TiO_5$, 2 to 35 wt. % $FeTiO_5$, and 5 to 35 wt. % $Al_2O_3$.

The inventive NOx support materials combine properties of good strength and low coefficient of thermal expansion with resistance to migration of alkali metal from the NOx storage component. The coefficient of thermal expansion (22–800° C.) is less than $20 \times 10^{-7}/°$ C., preferably less than $10 \times 10^{-7}/°$ C., and the modulus of rupture as measured on a solid rod of circular cross section is greater than 1000 pounds per square inch, and preferably greater than 2000 pounds per square inch.

The following are definitions of terms useful in understanding the present invention:

"NOx trap" means a device capable of storing and reducing nitrogen oxides (NOx) under alternating lean-burn and rich-burn conditions. A NOx trap is composed of a support element for loading a NOx catalyst coating containing a NOx storage component;

"NOx support element" means a body onto which a NOx catalyst coating containing a NOx storage component is loaded;

"NOx catalyst coating" is composed of a carrier material, a NOx storage component, and a noble metal catalyst;

"NOx storage component" functions to adsorb/store the nitrogen oxides and contains at least an alkali metal;

"Lean-burn environment" occurs when there is an excess amount of oxygen;

"Rich-burn environment" occurs when there are fuel-rich conditions.

DETAILED DESCRIPTION OF THE DRAWINGS

DETAILED DESCRIPTION OF PREFERRED EMBODIMENTS

Figure 1:
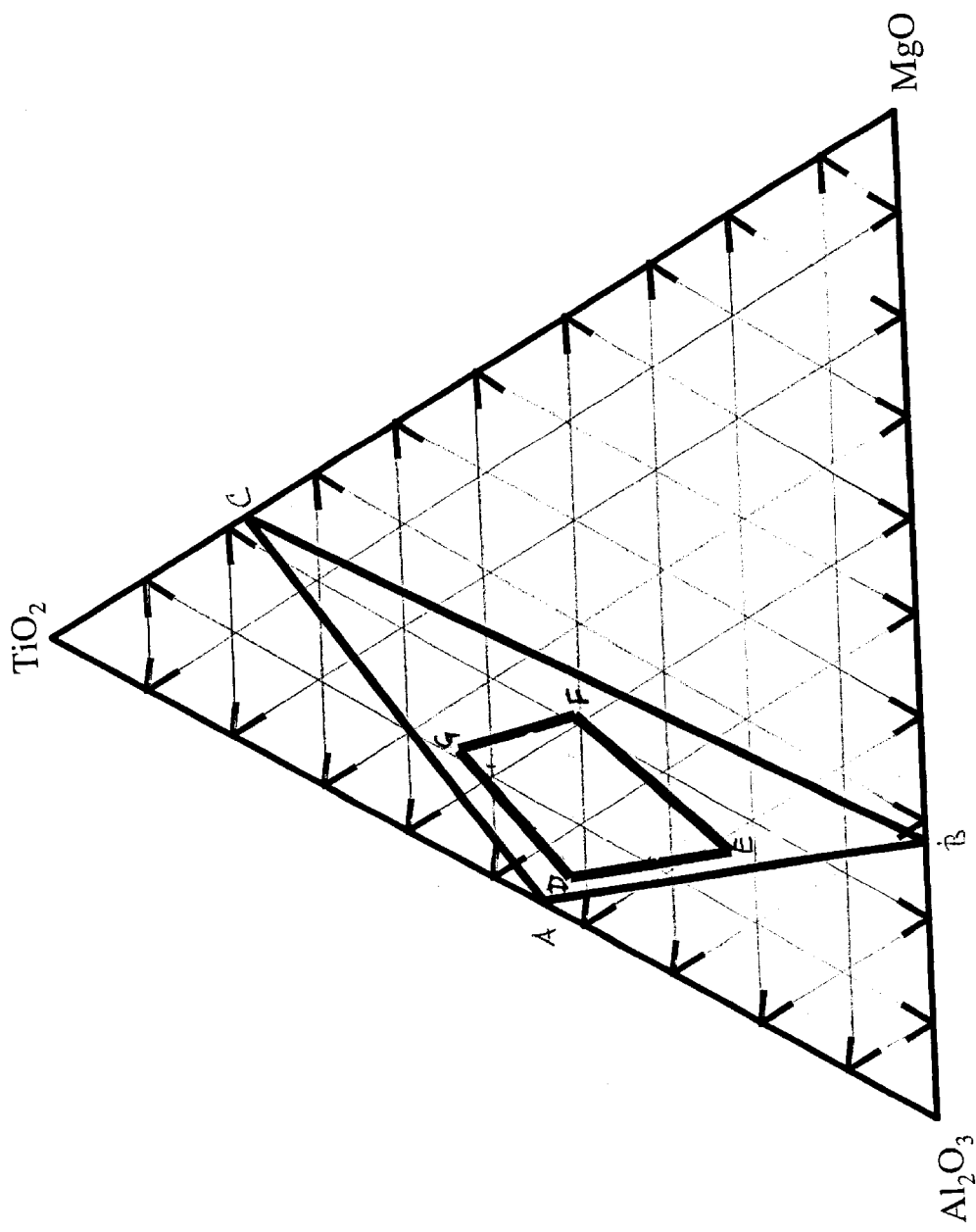
FIG. 1 illustrates a triaxial composition diagram of the system $Al_2TiO_5$—$MgTi_2O_5$—$MgAl_2O_4$ which indicates a preferred composition delineated by points D-E-F-G, for the ceramic NOx trap support of the present invention.

In one embodiment the NOx support element of the invention is a made of a refractory ceramic having a composition defined by lines joining points A, B, and C in FIG. 1. These points identify the ternary system $Al_2TiO_5$—$MgTi_2O_5$—$MgAl_2O_4$. A preferred system is represented by the lines joining points D, E, F, and G. Specifically, this preferred system consists essentially, in terms of weight percent on an oxide basis, of 15 to 90 wt. % $Al_2TiO_5$, 2 to 45 wt. % $MgTi_2O_5$, and 5 to 55 wt. % $MgAl_2O_4$.

Figure 2:
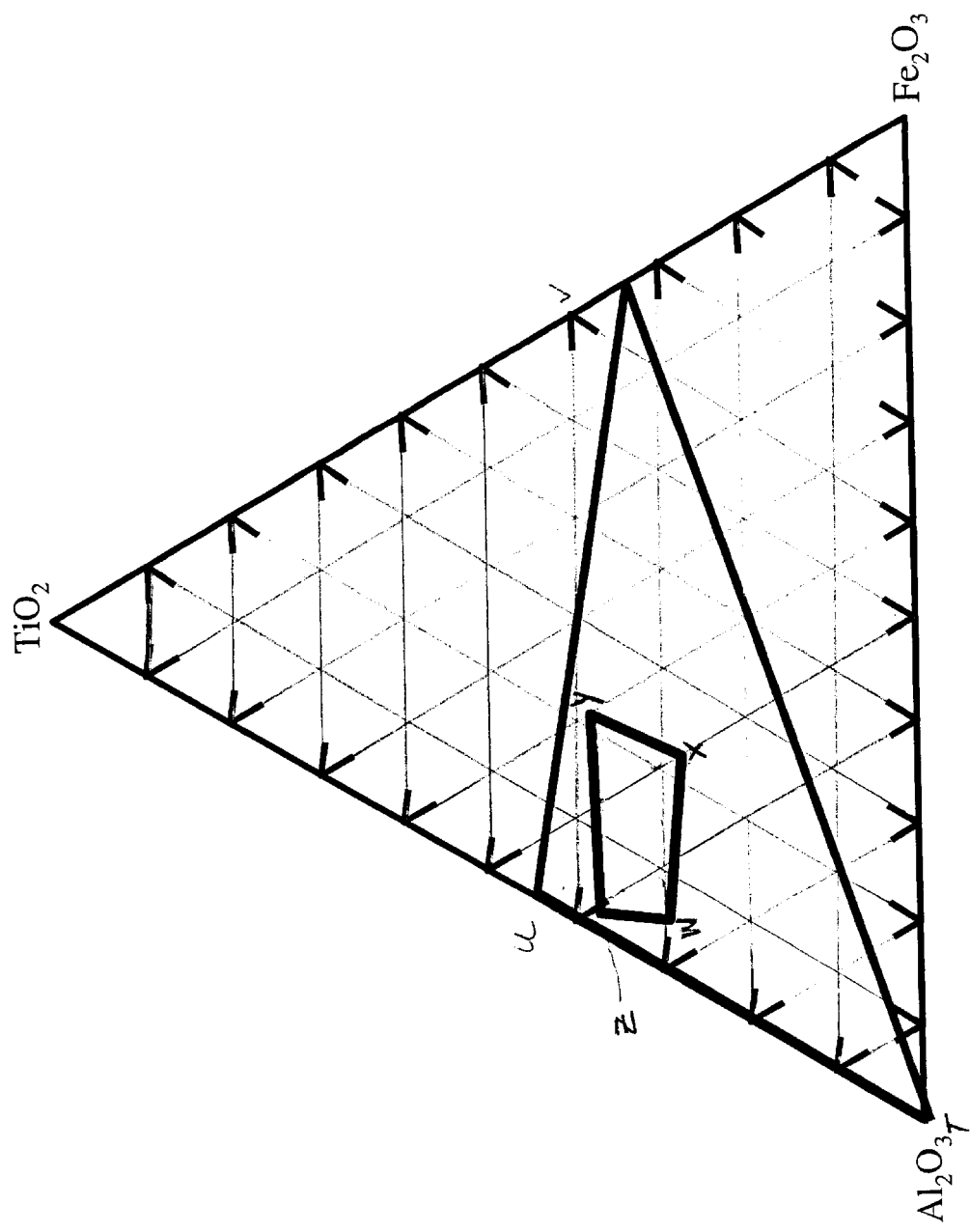
FIG. 2 illustrates another triaxial composition diagram of the system $Al_2TiO_5$—$FeTiO_5$—$Al_2O_3$ which indicates another preferred composition delineated by points W-X-Y-Z, for the ceramic NOx trap support of the present invention.

In another embodiment the NOx support element of the invention is made of a refractory ceramic having a composition defined by lines joining points T, U, and V in FIG. 2. These points define a preferred system $Al_2TiO_5$—$FeTiO_5$—$Al_2O_3$. A preferred system is represented by the lines joining points W, X, Y, and Z. Specifically, this preferred system consists essentially, in terms of weight percent on an oxide basis, of 35 to 85 wt. % $Al_2TiO_5$, 2 to 35 wt. % $FeTiO_5$, and 5 to 35 wt. % $Al_2O_3$.

The inventive NOx support element is particularly suitable for supporting NOx catalyst coatings containing an alkali metal NOx storage component, such as potassium (K). The inventive NOx support element promises greater resistance to interaction with the alkali-metal storage component superior to cord ierite supports currently available.

Other advantages of the inventive NOx support element include a low coefficient of thermal expansion and high strength, making it suitable for use in harsh environments. The support element exhibits a four-point modulus of rupture as measured on a solid rod of circular cross section of greater than about 1000 pounds per square inch (psi), and more preferably greater than 2000 psi. The mean coefficient of thermal expansion from 22–800° C. is less than less than about $20 \times 10^{-7}$/°C., and more preferably less than about $10 \times 10^{-7}$/° C., resulting in excellent thermal shock resistance.

While the inventive NOx support element can have any shape or geometry suitable for a particular application, it is preferred that it be a multicellular structure such as a honeycomb structure. The honeycomb structure has an inlet and outlet end or face, and a multiplicity of cells extending from the inlet end to the outlet end, the cells having porous walls. The total porosity is about 3–55%, preferably about 10–35%, with pores having diameters ranging between about 0.5–25 microns, preferably about 1–15 microns. Cellular densities of the honeycomb structure range from about 100 cells/in² (15.5 cells/cm²) to about 1000 cells/in² (62 cells/cm²), with wall thickness of the individual cells ranging from 50–200 microns.

A suitable method of producing the inventive NOx trap support structure involves forming a batch of powdered raw materials which include alumina ($Al_2O_3$), titania ($TiO_2$), magnesia (MgO), and iron oxide ($Fe_2O_3$) combined with organic constituents to form a plasticized mixture, then shaping the mixture into a green body and firing to a desired temperature and a sufficient time to develop the final product structure.

To more fully illustrate the invention, the following non-limiting examples are presented in the following Table. All parts, portions, and percentages are on a weight basis unless otherwise stated.

TABLE

| Example Number | 1 | 2 | 3 |
|---|---|---|---|
| Raw Materials (% weight) | | | |
| $Al_2O_3$ | 51.24 | 43.79 | 61.31 |
| $TiO_2$ | 43.57 | 48.34 | 33.48 |
| MgO | 5.19 | 7.86 | — |
| $Fe_2O_3$ | — | — | 5.21 |
| Binder, Lubricant, Solvent (% weight) | | | |
| Methyl Cellulose | | | |
| Sodium Stearate | | | |
| Firing Conditions | | | |
| Heating Rate (° C./hr) | 50 | 50 | 50 |
| Max. Temp. (° C.) | 1500 | 1500 | 1500 |
| Hold Time (hours) | 8 | 8 | 8 |
| Crystal Phase Assemblage (% volume) | | | |
| $Al_2TiO_5$ | 80.29 | 68.65 | 70.77 |
| $MgTi_2O_5$ | 9.28 | 20.63 | |
| $MgAl_2O_4$ | 10.24 | 10.72 | |
| $Al_2O_3$ | — | — | 22.05 |
| $Fe_2TiO_5$ | — | — | 7.18 |
| Properties | | | |
| Mean CTE from 22–800° C. ($10^{-7}$/° C.) | 4.7 | — | 3.5 |
| Four-Point Flexural Strength (lb/in²) | 1495 | — | 2700 |

The examples are prepared by weighing out the dry ingredients, mixing them with water and the organic components, binder and lubricant, and kneading the mixture in a stainless steel muller to form a plastic mass. The resulting plastic mass is extruded into a honeycomb. Honeycombs are structures made of a matrix of thin, porous, intersecting vertically extending walls and horizontally extending walls which define a multiplicity of cells extending in a substantially longitudinal and mutually parallel fashion through the body between opposing ends. The extrusion operation can be done using a hydraulic ram extrusion press, or a two stage de-airing single auger extruder, or a twin screw mixer with a die assembly attached to the discharge end.

After drying, the parts are heated for a time and a temperature sufficient to develop the final product structure. Preferably, the parts are heated to a maximum temperature of about 1400–1600° C. over a period of about 24–60 hours, and held at the maximum temperature for about 4–12 hours. The examples provided in the Table were heated to 1500° C. at the rate of 50° C./hour, with a hold time of 8 hours.

The weight percentages of $Al_2TiO_5$, $MgTi_2O_5$, $MgAl_2O_4$, $FeTiO_5$, and $Al_2O_3$ in the fired body were measured by powder x-ray diffractometry using internal standards. The strength in pounds per square inch (psi) was obtained by measuring the four-point modulus of rupture on a solid rod of circular cross section, as known in the art. Mean coefficients of thermal expansion from 22–800° C. were measured on rod or cellular specimens using a dilatometer, as known in the art.

The properties reflect the advantages of the inventive structures, namely good strength of greater than 1000 pounds per square inch and low coefficient of thermal expansion of up to $5 \times 10^{-7}$/° C., in combination with good resistance to potassium migration from the NOx storage component, after exposure to 900° C. for 100 hours. Other advantages include resistance to decomposition after exposure to thermal aging at 1000° C. after 100 hours.

The inventive NOx trap support is suitable for supporting NOx catalyst coatings containing an alkali metal NOx storage component. The NOx catalyst coating is typically in the form of a washcoat and comprises a high surface area carrier material having a surface area of between about 10 to 300 m²/g. The carrier material for the NOx storage component and the noble metal catalyst is preferably gamma alumina, although other materials including zeolite, zirconia, alpha alumina, cerium oxide and magnesium oxide are also suitable. Examples of catalytic noble metals include platinum, rhodium, palladium, iridium, osmium, silver and the like. The noble metal catalyst may loaded in an amount of from 0.1 to 20 grams, further preferably from 0.5 to 10 grams, with respect to 100 grams of carrier material.

The NOx storage component contains an alkali metal compound, and may additionally contain an alkaline earth metal and/or a rare earth metal. The alkali metal includes potassium, sodium, lithium, cesium, rubidium, and/or francium. Potassium is preferred as it exhibits NOx sorption efficiency at increased temperatures and over a much larger temperature range than other alkali metal NOx storage components. Alkaline earth metals include barium, beryllium, calcium, strontium, and/or magnesium. Rare earth metals include lanthanum, yttrium, scandium, cerium, praseodymium, and/or neodymium. The amount of NOx storage component supported by the carrier layer is about 0.025 to 0.5 moles with respect to 100 grams of carrier material.

The NOx storage component and the noble metal catalyst may be mixed together with a slurry of the carrier material and the washcoat mixture thereafter applied to the NOx support element to form the NOx catalyst coating. Alternatively, the carrier material can be first washcoated onto the NOx support element and thereafter the NOx storage component and the noble metal catalyst can be washcoated as a mixture, or as sequential washcoats, onto the NOx support element having the carrier material already supported thereon. The actual method utilized to washcoat the NOx support element is not important to the invention disclosed herein and thus any manner suitable to those skilled in the art would be acceptable. In any of these washcoat techniques, after applying the various washcoats to the NOx support element, the materials are generally dried and calcined at elevated temperatures.

As apparent from the foregoing description, the NOx trap support materials of the present invention provide good strength and low coefficient of thermal expansion and are excellent for use with NOx storage components containing an alkali metal compound.

While the present invention has been described with reference to what is presently considered to be preferred embodiments thereof, it is to be understood that the invention is not limited to the disclosed embodiment, examples or constructions. To the contrary, the invention is intended to cover various modifications and equivalent arrangements included within the scope of the appended claims.

What is claimed is:

1. A ceramic support for a NOx trap, the ceramic support capable of supporting a catalyst washcoat which includes a high surface area carrier, a noble metal catalyst and a NOx storage component comprising an alkali metal, the ceramic support having a composition lying within a ternary system selected from the group consisting of $Al_2TiO_5$—$MgTi_2O_5$—$MgAl_2O_4$ and $Al_2TiO_5$-$FeTiO_5$-$Al_2O_3$, the ceramic support characterized by a modulus of rupture strength as measured on a solid rod of circular cross section of greater than 1000 pounds per square inch and a coefficient of thermal expansion (22–800°C.) of less than $20 \times 10^{-7}$/°C.

2. The ceramic support of claim 1 wherein the composition is within the ternary system $Al_2TiO_5$—$MgTi_2O_5$—$MgAl_2O_4$.

3. The ceramic support of claim 2 wherein the composition con terms of weight percent on an oxide basis, of 15 to 90 wt. % $Al_2TiO_5$, 2 to 45 wt. % $MgTi_2O_5$, and 5 to 55 wt. % $MgAl_2O_4$.

4. The ceramic support of claim 1 wherein the composition is within the ternary system $Al_2TiO_5$-$FeTiO_5$-$Al_2O_3$.

5. The ceramic support of claim 4 wherein the composition consists essentially, in terms of weight percent on an oxide basis, of 35 to 85 wt. % $Al_2TiO_5$, 2 to 35 wt. % $FeTiO_5$, and 5 to 35 wt. % $Al_2O_3$.

6. The ceramic support of claim 1 wherein the alkali metal is selected from the group consisting of potassium, sodium, lithium, cesium, rubidium, and francium.

7. The ceramic support of claim 6 wherein the alkali metal is potassium.

8. The ceramic support of claim 1 wherein the NOx storage component further comprises a component selected from the group consisting of alkaline earth metals, rare earth metals and combinations thereof.

9. The ceramic support of claim 8 wherein the NOx storage component is a combination of an alkaline metal and an alkaline earth metal.

10. The ceramic support of claim 1 wherein the support is a honeycomb structure.

11. The ceramic support of claim 1 wherein the coefficient of thermal expansion (22–800°C.) of less than $10 \times 10^{-7}$/°C.

12. The ceramic support of claim 1 wherein the modulus of rupture strength is greater than 2000 pounds per square inch.

13. The ceramic support of claim 1 wherein the high surface area carrier material is gamma alumina.

14. The ceramic support of claim 1 wherein the noble metal catalyst is selected from the group consisting of platinum, rhodium, palladium, iridium, osmium, and silver.

15. A ceramic support for a NOx trap which includes a NOx storage component comprising an alkali metal, the ceramic support having a composition lying within ternary system of $Al_2TiO_5$—$MgTi_2O_5$—$MgAl_2O_4$ and consisting essentially, in terms of weight percent on an oxide basis, of 15 to 90 wt. % $Al_2TiO_5$, 2 to 45 wt. % $MgTi_2O_5$, and 5 to 55 wt. % $MgAl_2O_4$, the ceramic support characterized by a modulus of rupture strength as measured on a solid rod of circular cross section of greater than 1000 pounds per square inch and a coefficient of thermal expansion (22–800°C.) of less than $20 \times 10^{-7}$/°C.

16. The ceramic support of claim 15 wherein the support is a honeycomb structure.

17. A ceramic support for a NOx trap which includes a NOx storage component comprising an alkali metal, the ceramic support having a composition lying within ternary system $Al_2TiO_5$-$FeTiO_5$-$Al_2O_3$, the ceramic support characterized by a modulus of rupture strength as measured on a solid rod of circular cross section of greater than 1000 pounds per square inch and a coefficient of thermal expansion (22–800°C.) of less than $20 \times 10^{-7}$/°C.

18. The ceramic support of claim 17 wherein the composition consists essentially, in terms of weight percent on an oxide basis, of 35 to 85 wt. % $Al_2TiO_5$, 2 to 35 wt. % $FeTiO_5$, and 5 to 35 wt. % $Al_2O_3$.

19. The ceramic support of claim 17 wherein the support is a honeycomb structure.

* * * * *

UNITED STATES PATENT AND TRADEMARK OFFICE
CERTIFICATE OF CORRECTION

PATENT NO. : 6,677,272 B2
DATED : January 13, 2004
INVENTOR(S) : Beall et al.

It is certified that error appears in the above-identified patent and that said Letters Patent is hereby corrected as shown below:

Column 5,
Lines 56-57, "composition con terms" should be -- composition consists essentially, in terms --

Signed and Sealed this

Twenty-second Day of June, 2004

JON W. DUDAS
*Acting Director of the United States Patent and Trademark Office*